（12）United States Patent
Inomoto et al.

(10) Patent No.: US 8,762,593 B2
(45) Date of Patent: Jun. 24, 2014

(54) DATA TRANSMISSION SYSTEM AND DATA COMMUNICATION DEVICE

(71) Applicant: Fujitsu Component Limited, Tokyo (JP)

(72) Inventors: Yutaka Inomoto, Tokyo (JP); Yuichiro Terasawa, Tokyo (JP); Kazuhiro Yasuno, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 13/650,740

(22) Filed: Oct. 12, 2012

(65) Prior Publication Data

US 2013/0227176 A1   Aug. 29, 2013

(30) Foreign Application Priority Data

Feb. 24, 2012   (JP) ................................. 2012-038936

(51) Int. Cl.
*G06F 3/00*   (2006.01)
(52) U.S. Cl.
USPC .................................. 710/16; 710/14; 710/19
(58) Field of Classification Search
None
See application file for complete search history.

(56) References Cited

U.S. PATENT DOCUMENTS

2002/0091858 A1 *  7/2002  Yasaki et al. ................... 709/238
2004/0252239 A1   12/2004  Niiyama

FOREIGN PATENT DOCUMENTS

| JP | 8-204777 | 8/1996 |
| JP | 9-305508 | 11/1997 |
| JP | 2004-356939 | 12/2004 |

OTHER PUBLICATIONS

Patent Abstracts of Japan Publication No. 2004-356939, Published Dec. 16, 2004.
Patent Abstracts of Japan Publication No. 08-204777, Published Aug. 9, 1996.
Patent Abstracts of Japan Publication No. 09-305508, Published Nov. 28, 1997.

* cited by examiner

*Primary Examiner* — Ernest Unelus
*Assistant Examiner* — Ronald Modo
(74) *Attorney, Agent, or Firm* — Staas & Halsey LLP

(57) ABSTRACT

A communication device includes: a first and a second connectors that are connectable to an external device via a first and a second cables, respectively; a detector that detects attachment and detachment of the second cable to the second connector; and a controller that communicates information on attachment and detachment of the second cable to the external device via the first cable, changes a communication mode from a first mode to a second mode when the second cable is attached to the second connector, and changes the communication mode from the second mode to the first mode when the second cable is detached from the second connector, the first mode being a mode in which the controller communicates with the external device via the first cable, and the second mode being a mode in which the controller communicates with the external device via the first and the second cables.

10 Claims, 8 Drawing Sheets

FIG. 4A

```
1. VIDEO SIGNAL R+
2. VIDEO SIGNAL R−
3. SERIAL SIGNAL
4. VIDEO SIGNAL G+
5. VIDEO SIGNAL G−
6. SERIAL SIGNAL
7. VIDEO SIGNAL B+
8. VIDEO SIGNAL B−
```

FIG. 4B

```
1. AUDIO DATA +
2. AUDIO DATA −
3. SERIAL TxD+
4. AUDIO CLOCK +
5. AUDIO CLOCK −
6. SERIAL TxD−
7. SERIAL RxD+
8. SERIAL RxD−
```

US 8,762,593 B2

DATA TRANSMISSION SYSTEM AND DATA COMMUNICATION DEVICE

CROSS-REFERENCE TO RELATED APPLICATION

This application is based upon and claims the benefit of priority of the prior Japanese Patent Application No. 2012-038936, filed on Feb. 24, 2012, the entire contents of which are incorporated herein by reference.

FIELD

A certain aspect of the embodiments discussed herein is related to a data transmission system and a data communication device.

BACKGROUND

Conventionally, there has been known a technique that switches a communication mode from wire communication to wireless communication (see Japanese Laid-Open Patent Application Nos. 09-305508 and 08-204777).

Further, there has been conventionally known a data transmission system including: a local unit that transmits an analog video signal (i.e., an RGB signal) output from a computer and a response signal relating to the operation of a keyboard and a mouse to a remote place with a Cat5 (i.e., category 5) cable including four pairs of signal lines; and a remote unit that transmits an operation signal of the keyboard and the mouse to the local unit and receives the above-mentioned analog video signal and the above-mentioned response signal (see Japanese Laid-Open Patent Application No. 2004-356939).

SUMMARY

According to an aspect of the present invention, there is provided a data transmission system having a local device and a remote device, including: the local device including: a first connector that is connected to the remote device via a first cable; a second connector that is connectable to the remote device via a second cable; a first detector that detects the attachment and the detachment of the second cable to the second connector; and a first controller that communicates information on the attachment and the detachment of the second cable to the remote device via the first cable, changes a communication mode from a first mode to a second mode when the second cable is attached to the second connector, and changes the communication mode from the second mode to the first mode when the second cable is detached from the second connector, the first mode being a mode in which the first controller communicates with the remote device via the first cable, and the second mode being a mode in which the first controller communicates with the remote device via the first and the second cables; the remote device including: a third connector that is connected to the local device via the first cable; a fourth connector that is connectable to the local device via the second cable; a second detector that detects the attachment and the detachment of the second cable to the fourth connector; and a second controller that communicates information on the attachment and the detachment of the second cable to the local device via the first cable, changes a communication mode from the first mode to the second mode when the second cable is attached to the fourth connector, and changes the communication mode from the second mode to the first mode when the second cable is detached from the fourth connector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating specifications of pins included in each of LAN terminals 26 and 46;

FIG. 4B is a diagram illustrating specifications of pins included in each of LAN terminals 27 and 47;

DESCRIPTION OF EMBODIMENTS

Figure 1A:
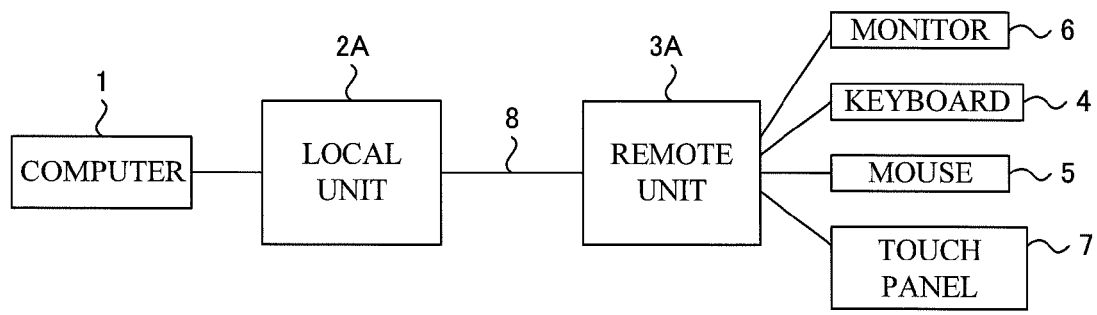
FIGS. 1A and 1B are block diagrams of data transmission systems according to a reference embodiment.
Figure 1B:
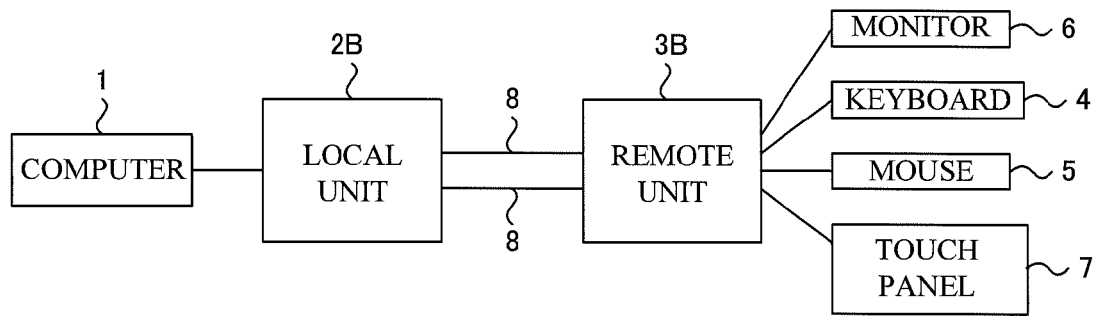

FIGS. 1A and 1B are block diagrams of data transmission systems according to a reference embodiment. A data transmission system 10A in FIG. 1A includes a computer 1, a local unit 2A and a remote unit 3A. The local unit 2A is connected to the remote unit 3A via a single Cat5 (Category 5) cable 8. A keyboard 4, a mouse 5, a monitor 6 and a touch panel 7 are connected to the remote unit 3A. The Cat5 cable 8 includes four pairs of signal lines.

In the above-mentioned data transmission system 10A, the local unit 2A transmits an analog video signal to the remote unit 3A with three pairs of signal lines, and transmits a response signal relating to the operation of the keyboard and the mouse to the remote unit 3A with a remaining pair of signal lines.

Therefore, when the computer 1 transmits a serial signal to the touch panel 7, no unused signal line exists, and hence the local unit 2A superimposes the serial signal on the response signal and transmits the superimposed signal to the remote unit 3A. In this case, since the baud rate of the serial transmission is fixed at 9600 bps, a device (e.g., the touch panel 7) which does not correspond to this baud rate cannot be connected to the remote unit 3A.

On the contrary, the data transmission system 10B in FIG. 1B includes the computer 1, a local unit 2B and a remote unit 3B. The local unit 2B is connected to the remote unit 3B via two Cat5 cables 8. The keyboard 4, the mouse 5, the monitor 6 and the touch panel 7 are connected to the remote unit 3B.

The local unit 2B transmits the analog video signal and the response signal relating to the operation of the keyboard and the mouse to the remote unit 3B with the first Cat5 cable 8, and transmits the serial signal for the touch panel 7 to the remote unit 3B with the second Cat5 cable 8. In this case, a device (e.g., the touch panel 7) having a baud rate of 1200 bps or more can be connected to the remote unit 3B. However, in the data transmission system 10B, the two Cat5 cables 8 are required.

By the way, when one of the data transmission system 10A or 10B is placed and then the placed data transmission system is changed to the other data transmission system, the local unit and the remote unit have to be changed physically. For example, when the data transmission system 10A is changed to the data transmission system 10B, the local unit 2A and the remote unit 3A have to be replaced with the local unit 2B and the remote unit 3B.

A description will now be given of an exemplary embodiment with reference to the accompanying drawings.

Figure 2:
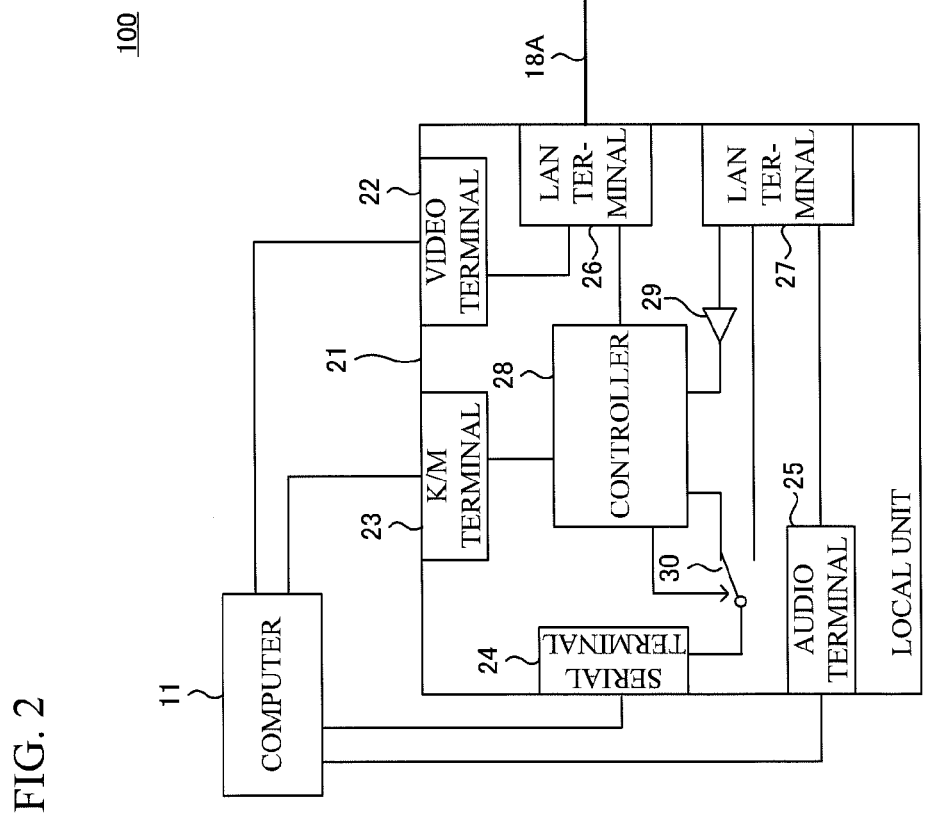
FIG. 2 is a schematic block diagram of a data transmission system according to an embodiment when a single Cat5 cable is connected between a local unit and a remote unit.
Figure 3:
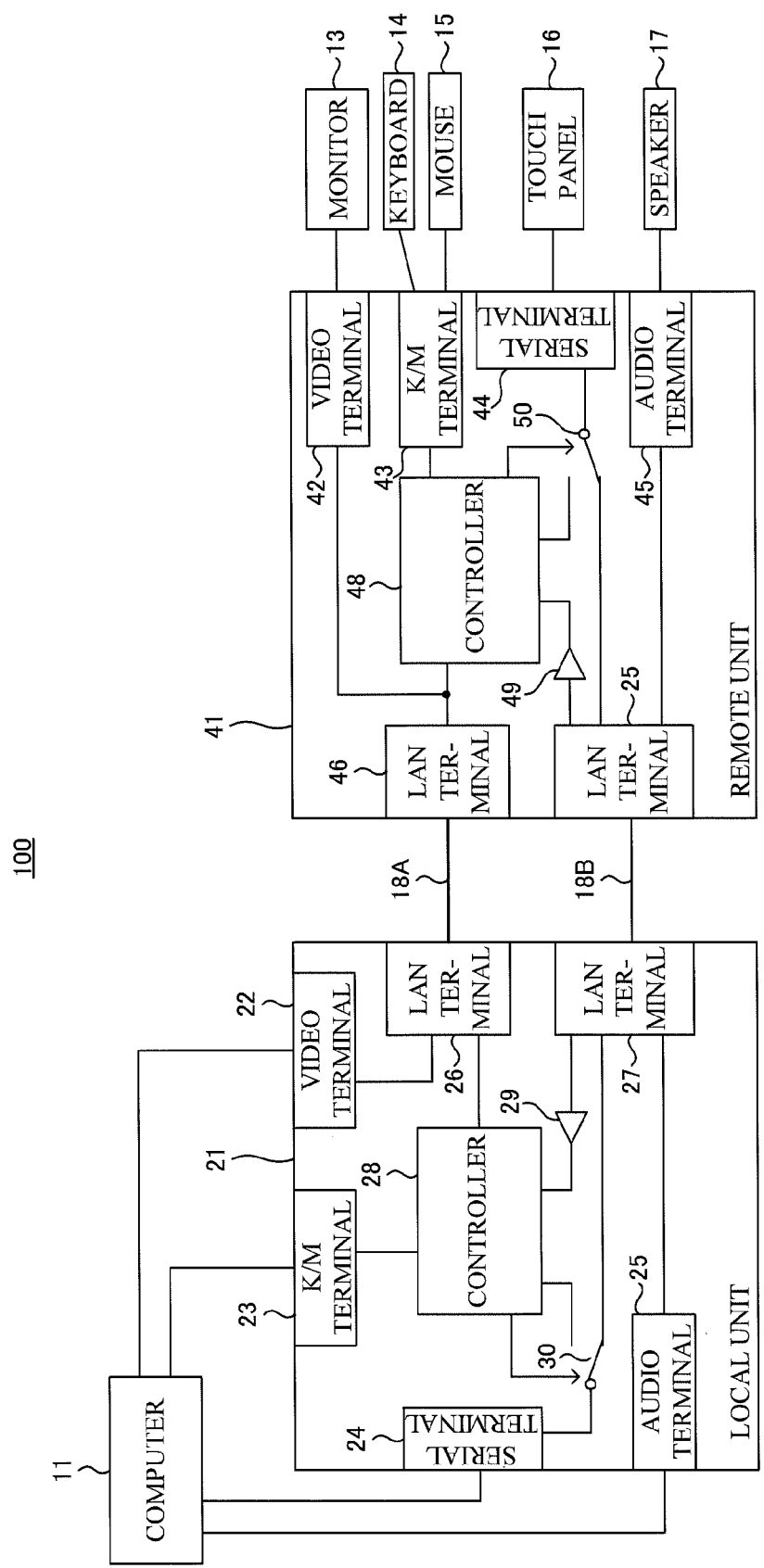
FIG. 3 is a schematic block diagram of the data transmission system when two Cat5 cables are connected between the local unit and the remote unit.

FIG. 2 is a schematic block diagram of a data transmission system according to an embodiment when a single Cat5 cable is connected between a local unit and a remote unit. FIG. 3 is a schematic block diagram of the data transmission system when two Cat5 cables are connected between the local unit and the remote unit.

A data transmission system 100 includes a computer 11, a local unit 21 and a remote unit 41. Each of the local unit 21 and the remote unite 41 functions as a data communication device.

The local unit 21 includes: a video terminal 22 that inputs an analog video signal (i.e., an RGB signal) output from the computer 11; a K/M (keyboard/mouse) terminal 23 that outputs an operation signal of the keyboard and the mouse to the computer 11 and inputs a response signal corresponding to the operation signal from the computer 11; a serial terminal 24 that outputs serial data from a serial device (e.g. a touch panel 16) to the computer 11 and receives response data corresponding to the serial data from the computer 11; and an audio terminal 25 that inputs audio data from the computer 11. Moreover, the local unit 21 includes: a LAN (Local Area Network) terminal 26 that connects a Cat5 (category 5) cable 18A; a LAN terminal 27 that connects a Cat5 cable 18B (see FIG. 3); a controller 28 that controls the whole operation of the local unit 21; a differential amplifier 29 that detects the attachment and the detachment of a second Cat5 cable (i.e., the Cat5 cable 18B); and a switch 30 that switches an output destination of the serial data from the serial terminal 24, to any one of the controller 28 or the LAN terminal 27. The LAN terminal 26 functions as a first connector, and the LAN terminal 27 functions as a second connector. The differential amplifier 29 functions as a first detector, and the controller 28 functions as a first controller. The switch 30 functions as a first switch.

The controller 28 is composed of a microcomputer, for example, and is connected to the K/M terminal 23, the LAN terminal 26, the differential amplifier 29 and the switch 30. The video terminal 22 is connected to the LAN terminal 26, and the serial terminal 24 is connected to the switch 30. Also, the LAN terminal 27 is connected to the differential amplifier 29 and the audio terminal 25.

The remote unit 41 includes: a video terminal 42 that outputs the analog video signal (i.e., the RGB signal) to a monitor 13; a K/M (keyboard/mouse) terminal 43 that outputs the operation signal of a keyboard 14 and a mouse 15 to the computer 11; a serial terminal 44 that outputs the serial data from the serial device (e.g. the touch panel 16) to the computer 11, and receives the response data corresponding to the serial data from the computer 11; and an audio terminal 45 that outputs the audio data from the computer 11 to a speaker 17. Moreover, the remote unit 41 includes: a LAN (Local Area Network) terminal 46 that connects the Cat5 (category 5) cable 18A; a LAN terminal 47 that connects the Cat5 cable 18B; a controller 48 that controls the whole operation of the remote unit 41; a differential amplifier 49 that detects the attachment and the detachment of the second Cat5 cable (i.e., the Cat5 cable 18B); and a switch 50 that switches an output destination of the serial data from the serial terminal 44, to any one of the controller 48 or the LAN terminal 47. The LAN terminal 46 functions as a third connector, and the LAN terminal 47 functions as a fourth connector. The differential amplifier 49 functions as a second detector, and the controller 48 functions as a second controller. The switch 50 functions as a second switch.

The controller 48 is composed of a microcomputer, for example, and is connected to the K/M terminal 43, the LAN terminal 46, the differential amplifier 49 and the switch 50. The video terminal 42 is connected between the LAN terminal 46 and the controller 48, and the serial terminal 44 is connected to the switch 30. The LAN terminal 47 is connected to the differential amplifier 49 and the audio terminal 45. Moreover, the monitor 13 is connected to the video terminal 42, and the keyboard 14 and the mouse 15 are connected to the K/M terminal 43. The touch panel 16 is connected to the serial terminal 44, and the speaker 17 is connected to the audio terminal 45. Although in the present embodiment, the touch panel 16 is used as an example of the serial device, the serial device is not limited to this and may be a cell-phone, a printer, or the like.

When the local unit 21 and the remote unit 41 communicate with each other, the controllers 28 and 48 are set to a first mode or a second mode. The first mode is a mode in which the local unit 21 communicates with the remote unit 41 via the single Cat5 cable 18A. The second mode is a mode in which the local unit 21 communicates with the remote unit 41 via the Cat5 cable 18A and the Cat5 cable 18B. That is, the first mode is a mode in which the serial data from the serial device (e.g. the touch panel 16) passes through the controllers 28 and 48, or the transfer rate of the serial data from the serial device is constant. The second mode is a mode in which the serial data from the serial device does not pass through the controllers 28 and 48, or the transfer rate of the serial data from the serial device is variable. The first mode is different from the second mode in a communication pathway of the serial data from the serial device.

The differential amplifiers 29 and 49 detects the attachment and the detachment of the second Cat5 cable (i.e., the Cat5 cable 18B) by receiving the serial data periodically transmitted from the controllers 48 and 28 via the LAN terminals 47 and 27, respectively, or by receiving current levels or voltage levels of the LAN terminals 27 and 47. In the present embodiment, only when the Cat5 cable 18B is attached between the local unit 21 and the remote unit 41, the audio data from the computer 11 can be transmitted to the speaker 17.

Each of the Cat5 cables 18A and 18B includes four pairs of signal lines (i.e., a total of eight signal lines). FIG. 4A illustrates specifications of pins included in each of the LAN terminals 26 and 46. FIG. 4B illustrates specifications of pins included in each of the LAN terminals 27 and 47.

As illustrated in FIG. 4A, a first pin and a second pin in each of the LAN terminals 26 and 46 are used for transmission of differential signals functioning as the R (Red) signal. A fourth pin and a fifth pin in each of the LAN terminals 26 and 46 are used for transmission of differential signals functioning as the G (Green) signal. A seventh pin and an eighth pin in each of the LAN terminals 26 and 46 are used for transmission of differential signals functioning as the B (Blue) signal. A third pin and a sixth pin in each of the LAN terminals 26 and 46 are used when the serial data is transmitted as differential signals.

As illustrated in FIG. 4B, a first pin and a second pin in each of the LAN terminals 27 and 47 are used when the audio data is transmitted as differential signals. A fourth pin and a fifth pin in each of the LAN terminals 27 and 47 are used when a clock for the audio data is transmitted as differential signals. A third pin and a sixth pin in each of the LAN terminals 27 and 47 are used when the serial signal (T×D) is transmitted as differential signals. A seventh pin and an eighth pin in each of the LAN terminals 27 and 47 are used when the serial signal (R×D) is transmitted as differential signals.

Figure 5:
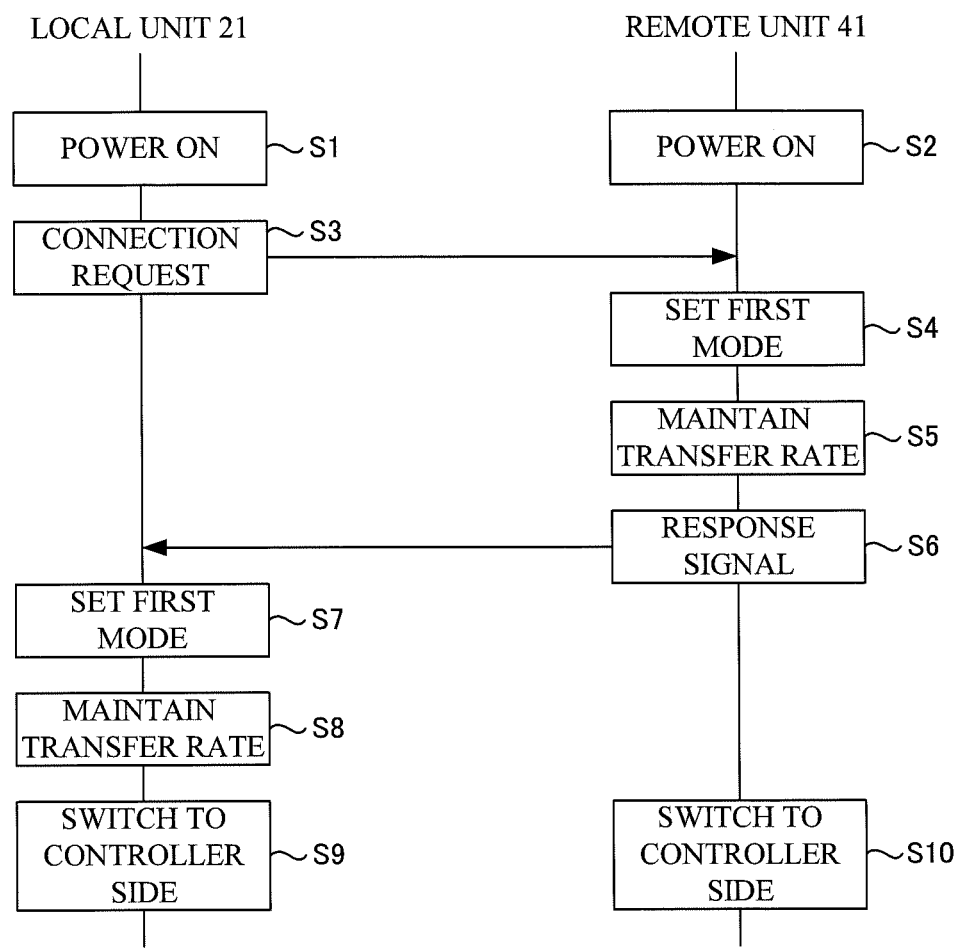
FIG. 5 is a sequence diagram illustrating the operation of the local unit and the remote unit when the Cat5 cable is connected between the local unit and the remote unit.

FIG. 5 is a sequence diagram illustrating the operation of the local unit 21 and the remote unit 41 when the Cat5 cable 18A is connected between the local unit 21 and the remote unit 41.

When the local unit 21 and the remote unit 41 are turned on (steps S1 and S2), the controller 28 of the local unit 21 outputs a connection request to the controller 48 of the remote unit 41 (step S3). When the controller 48 of the remote unit 41 receives the connection request, the controller 48 sets the first mode to the remote unit 41 (step S4), and holds the transfer rate of the serial data at 9600 bps, for example (step S5). Then, the controller 48 outputs a response signal to the controller 28 (step S6). When the controller 28 receives the response signal, the controller 28 sets the first mode to the local unit 21 (step S7). The controller 28 holds the transfer rate of the serial data at 9600 bps, for example (step S8).

Then, the controller 28 switches the output of the switch 30 to the side of the controller 28 (step S9). The controller 48 switches the output of the switch 50 to the side of the controller 48 (step S10).

The environment where the local unit 21 and the remote unit 41 communicate with each other through the single Cat5 cable 18A by the above sequence is established. In FIG. 5, the controller 28 outputs the connection request to the controller 48 and receives the response signal from the controller 48. However, the controller 48 may output the connection request to the controller 28 and receive the response signal from the controller 28.

Figure 6:
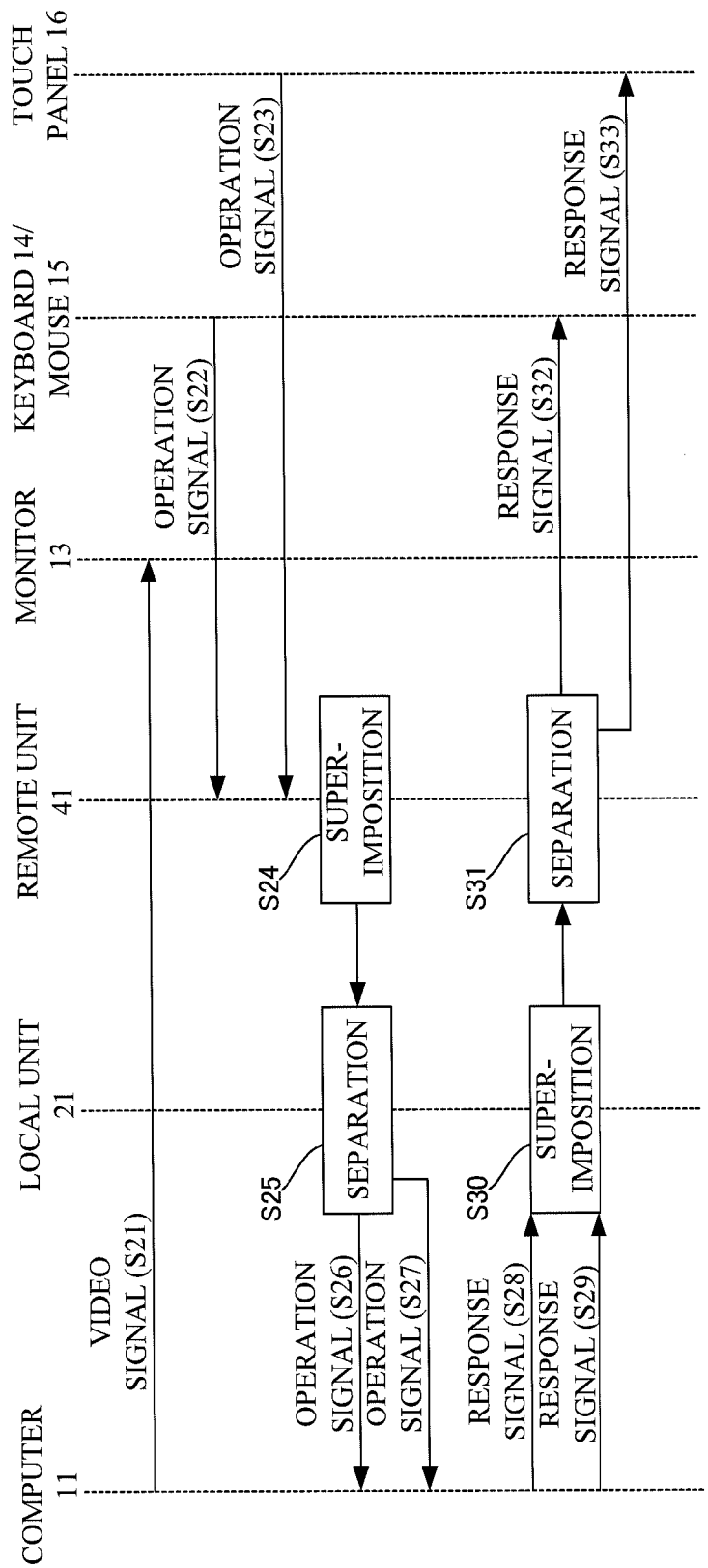
FIG. 6 is a sequence diagram illustrating the flow of various signals when a first mode is set up.

FIG. 6 is a sequence diagram illustrating the flow of various signals when the first mode is set up.

The video signal from the computer 11 is output to the monitor 13 via the video terminal 22, the LAN terminal 26, the Cat5 cable 18A, the LAN terminal 46 and the video terminal 42 (step S21).

The operation signal of the keyboard 14 and the mouse 15 is output to the controller 48 via the K/M terminal 43 (step S22). The operation signal (i.e., serial data) of the touch panel 16 is output to the controller 48 via the serial terminal 44 (step S23). The controller 48 superimposes the operation signal of the touch panel 16 on the operation signal of the keyboard 14 and the mouse 15, and outputs the superimposed signal to the controller 28 via the LAN terminal 46, the Cat5 cable 18A and the LAN terminal 26 (step S24). The controller 28 receives the superimposed signal and separates the superimposed signal into the operation signal of the touch panel 16 and the operation signal of the keyboard 14 and the mouse 15 (step S25). The operation signal of the keyboard 14 and the mouse 15 is output to the computer 11 via the K/M terminal 23 (step S26). The operation signal of the touch panel 16 is output to the computer 11 via the switch 30 and the serial terminal 24 (step S27).

The response signal corresponding to the operation signal of the keyboard 14 and the mouse 15 is output from computer 11 (step S28), and the response signal (i.e., serial data) corresponding to the operation signal of the touch panel 16 is output from computer 11 (step S29). The response signal corresponding to the operation signal of the keyboard 14 and the mouse 15 and the response signal corresponding to the operation signal of the touch panel 16 are superimposed by the controller 28, and the superimposed signal is output to the controller 48 (step S30). The controller 48 separates the superimposed signal into the response signal corresponding to the operation signal of the touch panel 16 and the response signal corresponding to the operation signal of the keyboard 14 and the mouse 15 (step S31). The response signal corresponding to the operation signal of the keyboard 14 and the mouse 15 may be processed by the controller 48, or may be output to the keyboard 14 and the mouse 15 (step S32). The response signal corresponding to the operation signal of the touch panel 16 is output to the touch panel (step S33).

Figure 7:
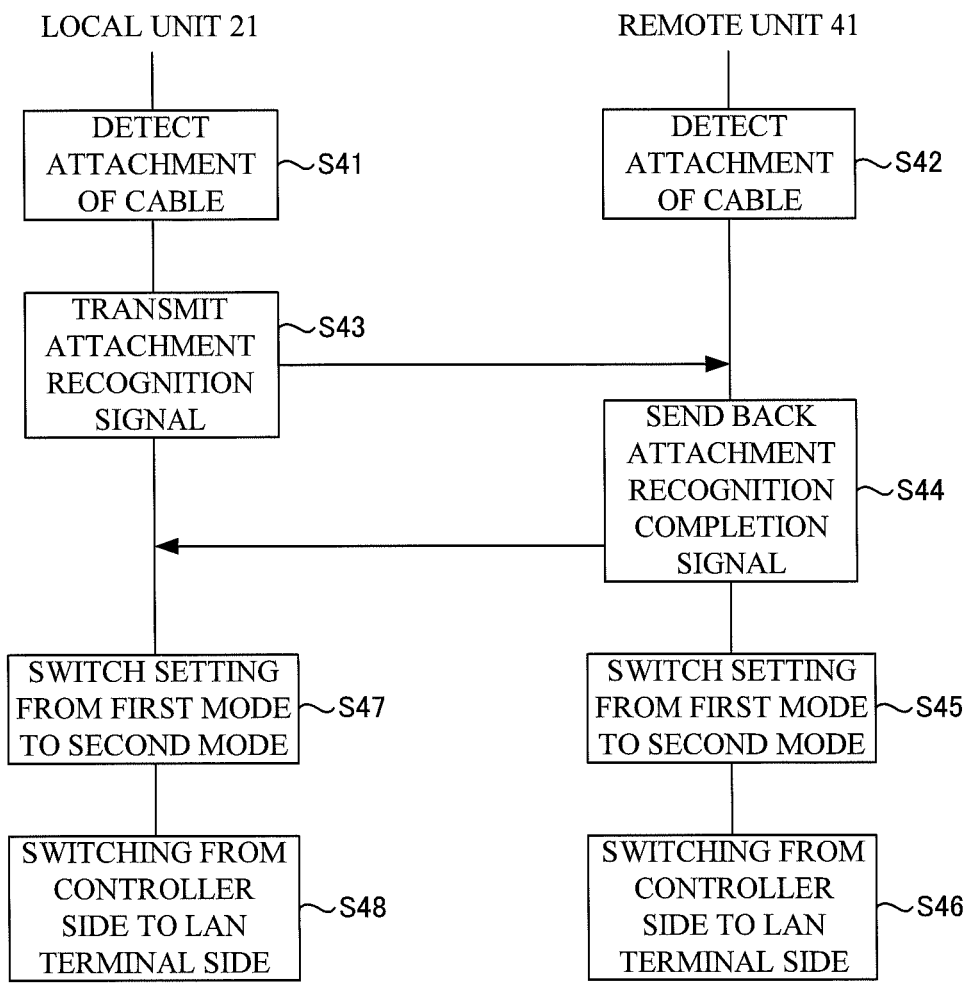
FIG. 7 is a sequence diagram illustrating a process when the first mode is switched to a second mode.

FIG. 7 is a sequence diagram illustrating a process when the first mode is switched to the second mode.

First, when the second Cat5 cable (i.e., the Cat5 cable 18B) is attached, the differential amplifiers 29 and 49 detect the attachment of the second Cat5 cable and notify the controllers 28 and 48 of the attachment of the second Cat5 cable, respectively (Steps S41 and S42).

The controller 28 recognizes the attachment of the second Cat5 cable, and transmits an attachment recognition signal for the second Cat5 cable to the controller 48 via the first Cat5 cable (i.e., the Cat5 cable 18A) (step S43). The attachment recognition signal is a signal indicating that the controller has recognized the attachment of the Cat5 cable.

When the controller 48 receives the attachment recognition signal for the second Cat5 cable, the controller 48 sends back an attachment recognition completion signal to the controller 28 via the first Cat5 cable (step S44). The attachment recognition completion signal is a signal indicating that the controller has recognized the attachment of the Cat5 cable to another unit.

Also, the controller 48 switches the setting of a communication mode of the controller 48 from the first mode to the second mode (step S45). In this case, the transfer rate of data passing through the Cat5 cable 18A is 9600 bps, and is the same as the transfer rate of the first mode. On the contrary, the transfer rate of serial data passing through the Cat5 cable 18B is 1200 bps or more, and is variable. That is, the serial device having the transfer rate of 1200 bps or more can be connected to the serial terminal 44.

Also, the controller 48 switches the switch 50 from the side of the controller 48 to the side of the LAN terminal 47 (step S46).

When the controller 28 receives the attachment recognition completion signal, the controller 28 switches the setting of the communication mode of the controller 28 from the first mode to the second mode (step S47). Moreover, the controller 28 switches the switch 30 from the side of the controller 28 to the side of the LAN terminal 27 (step S48).

In FIG. 7, a description is given of an example in which the second Cat5 cable is first attached to the local unit 21, and then is attached to the remote unit 41. However, the second Cat5 cable may be first attached to the remote unit 41, and then be attached to the local unit 21. In this case, the controller 48 transmits the attachment recognition signal for the second Cat5 cable to the controller 28, and the controller 28 sends back the attachment recognition completion signal to the controller 48.

Figure 8:
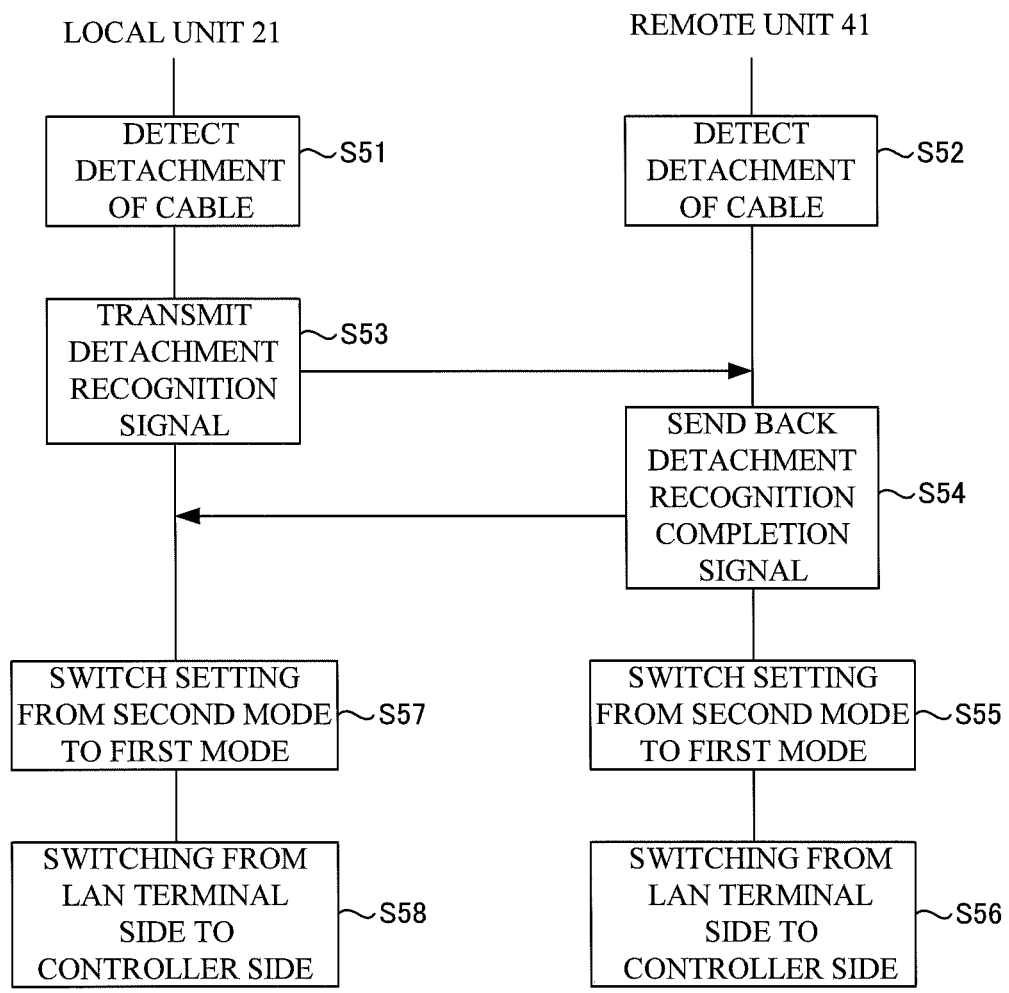
FIG. 8 is a sequence diagram illustrating a process when the second mode is switched to the first mode.

FIG. 8 is a sequence diagram illustrating a process when the second mode is switched to the first mode.

When the second Cat5 cable (i.e., the Cat5 cable 18B) is detached, the differential amplifiers 29 and 49 detect the attachment of the second Cat5 cable and notify the controllers 28 and 48 of the detachment of the second Cat5 cable, respectively (Steps S51 and S52).

The controller 28 recognizes the detachment of the second Cat5 cable, and transmits a detachment recognition signal for the second Cat5 cable to the controller 48 via the first Cat5 cable (i.e., the Cat5 cable 18A) (step S53). The detachment recognition signal is a signal indicating that the controller has recognized the detachment of the Cat5 cable.

When the controller 48 receives the detachment recognition signal for the second Cat5 cable, the controller 48 sends back a detachment recognition completion signal to the controller 28 via the first Cat5 cable (step S54). The detachment recognition completion signal is a signal indicating that the controller has recognized the detachment of the Cat5 cable from another unit.

Also, the controller 48 switches the setting of the communication mode of the controller 48 from the second mode to the first mode (step S55). In this case, the transfer rate of data passing through the Cat5 cable 18A is 9600 bps and becomes a fixed speed. The serial data from the serial device is superimposed on the operation data of the keyboard 14 and the mouse 15, and the superimposed signal is transmitted.

Also, the controller 48 switches the switch 50 from the side of the LAN terminal 47 to the side of the controller 48 (step S56).

When the controller 28 receives the detachment recognition completion signal, the controller 28 switches the setting of the communication mode of the controller 28 from the second mode to the first mode (step S57). Moreover, the controller 28 switches the switch 30 from the side of the LAN terminal 27 to the side of the controller 28 (step S58).

In FIG. 8, a description is given of an example in which the second Cat5 cable is first detached from the local unit 21, and then is detached from the remote unit 41. However, the second Cat5 cable may be first detached from the remote unit 41, and then be detached from the local unit 21. In this case, the controller 48 transmits the detachment recognition signal for the second Cat5 cable to the controller 28, and the controller 28 sends back the detachment recognition completion signal to the controller 48.

As described above, according to the present embodiment, the local unit 21 and the remote unit 41 can automatically switch the communication modes of the local unit 21 and the remote unit 41 from the first mode to the second mode according to the attachment of the second Cat5 cable. The local unit 21 and the remote unit 41 can automatically switch the communication modes thereof from the second mode to the first mode according to the detachment of the second Cat5 cable.

The transfer pathway and the transfer rate of the serial data from the serial device can be changed according to the attachment and the detachment of the second Cat5 cable. In addition, a transfer method of the serial data from the serial device can be changed according to the attachment and the detachment of the second Cat5 cable. Specifically, when the second Cat5 cable is attached to the local unit 21 and the remote unit 41, the serial data is transmitted without being superimposed on another data. On the contrary, when the second Cat5 cable is detached from the local unit 21 and the remote unit 41, the serial data is superimposed on another data and then is transmitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A data transmission system having a local device and a remote device, comprising:
   the local device including:
   a first connector that is connected to the remote device via a first cable;
   a second connector that is connectable to the remote device via a second cable;
   a first detector that detects the attachment and the detachment of the second cable to the second connector; and
   a first controller that communicates information on the attachment and the detachment of the second cable to the remote device via the first cable, changes a communication mode from a first mode to a second mode when the second cable is attached to the second connector, and changes the communication mode from the second mode to the first mode when the second cable is detached from the second connector, the first mode being a mode in which the first controller communicates with the remote device via the first cable, and the second mode being a mode in which the first controller communicates with the remote device via the first and the second cables;
   the remote device including:
   a third connector that is connected to the local device via the first cable;
   a fourth connector that is connectable to the local device via the second cable;
   a second detector that detects the attachment and the detachment of the second cable to the fourth connector; and
   a second controller that communicates information on the attachment and the detachment of the second cable to the local device via the first cable, changes a communication mode from the first mode to the second mode when the second cable is attached to the fourth connector, and changes the communication mode from the second mode to the first mode when the second cable is detached from the fourth connector.

2. The data transmission system according to claim 1, wherein an information processing apparatus is connected to the local device, and a serial device is connected to the remote device,
   the local device includes a first switch that switches a transfer pathway of serial data to be transmitted between the information processing apparatus and the serial device, according to the attachment and the detachment of the second cable, and
   the remote device includes a second switch that switches a transfer pathway of serial data to be transmitted between the information processing apparatus and the serial device, according to the attachment and the detachment of the second cable.

3. The data transmission system according to claim 2, wherein when the second cable is detached from the second connector and the fourth connector, a transfer rate of the serial data is held constant, and when the second cable is attached to the second connector and the fourth connector, the transfer rate of the serial data is variable.

4. The data transmission system according to claim 2, wherein when the second cable is attached to the second connector and the fourth connector, the serial data is transmitted from the remote device to the local device without being superimposed on another data, and when the second cable is detached from the second connector and the fourth connector, the second controller superimposes the serial data on another data and transmits superimposed data to the first controller, and the first controller separates the superimposed data into the serial data and the another data.

5. The data transmission system according to claim 2, wherein when the second cable is detached from the second connector and the fourth connector, each of the first switch and the second switch switches the transfer pathway of the serial data so that the serial data passes through the first cable, the first controller and the second controller, and when the second cable is attached to the second connector and the fourth connector, each of the first switch and the second switch switches the transfer pathway of the serial data so that the serial data passes through the second cable.

6. A communication device comprising:
a first connector that is connectable to an external device via a first cable;
a second connector that is connectable to the external device via a second cable;
a detector that detects the attachment and the detachment of the second cable to the second connector; and
a controller that transmits to and receives from the external device information on the attachment and the detachment of the second cable via the first cable, changes a communication mode from a first mode to a second mode when the second cable is attached to the second connector, changes the communication mode from the second mode to the first mode when the second cable is detached from the second connector, the first mode being a mode in which the controller communicates with the external device via the first cable, and the second mode being a mode in which the controller communicates with the external device via both of the first and the second cables.

7. The communication device according to claim 6, wherein an information processing apparatus is connected to the communication device, and the communication device includes a switch that switches a transfer pathway within the communication device of serial data communicated between the information processing apparatus and the external device, according to the attachment and detachment of the second cable.

8. The communication device according to claim 6, wherein serial data is transmitted between the communication device and the external device, and when the second cable is detached from the second connector, a transfer rate of the serial data is held constant, and when the second cable is attached to the second connector, the transfer rate of the serial data is variable.

9. The communication device according to claim 6, wherein serial data is transmitted between the communication device and the external device, and when the second cable is attached to the second connector, the serial data is transmitted between the communication device and the external device without being superimposed on another data, and when the second cable is detached from the second connector, the serial data onto which another data is superimposed is transmitted between the communication device and the external device.

10. The communication device according to claim 7, wherein serial data is transmitted between the communication device and the external device, and when the second cable is detached from the second connector, the switch switches the transfer pathway of the serial data so that the serial data passes through the first cable, and when the second cable is attached to the second connector, the switch switches the transfer pathway of the serial data so that the serial data passes through the second cable.

* * * * *